US006793495B2

(12) United States Patent
Kang

(10) Patent No.: US 6,793,495 B2
(45) Date of Patent: Sep. 21, 2004

(54) VIRTUAL REALITY SIMULATOR

(75) Inventor: Shin-Chang Kang, Gyeonggi-do (KR)

(73) Assignee: Vision Technology System Co., Ltd., Seoul (KR)

(*) Notice: Subject to any disclaimer, the term of this patent is extended or adjusted under 35 U.S.C. 154(b) by 354 days.

(21) Appl. No.: 10/103,855

(22) Filed: Mar. 25, 2002

(65) Prior Publication Data

US 2003/0134676 A1 Jul. 17, 2003

(30) Foreign Application Priority Data

Dec. 28, 2001 (KR) .................................. 10-2001-87043

(51) Int. Cl.⁷ ................................................ G09B 9/08
(52) U.S. Cl. .......................................... 434/55; 463/30
(58) Field of Search ............................ 434/29, 30, 46, 434/55–59; 463/1, 6, 30, 46; 472/29, 39, 42, 47; 273/148 B

(56) References Cited

U.S. PATENT DOCUMENTS

| | | | | |
|---|---|---|---|---|
| 5,366,375 A | * | 11/1994 | Sarnicola | 434/37 |
| 5,399,091 A | * | 3/1995 | Mitsumoto | 434/61 |
| 5,947,740 A | * | 9/1999 | Kim | 434/29 |
| 6,056,362 A | * | 5/2000 | de la Haye | 297/314 |
| 6,162,058 A | * | 12/2000 | Yang | 434/55 |
| 6,224,380 B1 | * | 5/2001 | Lo et al. | 434/55 |
| 6,396,462 B1 | * | 5/2002 | Mead et al. | 345/7 |
| 2001/0041326 A1 | * | 11/2001 | Zeier | 434/33 |
| 2002/0115043 A1 | * | 8/2002 | Baker et al. | 434/30 |

FOREIGN PATENT DOCUMENTS

KR 2001083829 A * 9/2001 .......... A63G/31/16

* cited by examiner

Primary Examiner—Mark Sager
Assistant Examiner—Steven L. Ashburn
(74) Attorney, Agent, or Firm—Foley & Lardner LLP

(57) ABSTRACT

Disclosed a virtual reality simulator for enabling a user to feel motion in virtual reality as the real. The virtual reality simulator comprises: a support frame; a disk plate provided over said support frame as distanced therefrom via a base plate; a lower plate rotatably coupled on said disk plate and having rotary means at one side thereof, an upper plate provided over said lower plate as distanced therefrom in a cooperative manner; a plurality of actuators hinged to the outer circumference of said upper plate and pivotal into the center and the outer circumference of said upper plate, each of said actuators being provided at an upper part with a piston and at a lower part with driving means for elevating said piston; a plurality of support plates pivotally provided on said pistons of the actuators via ball joints fixedly screwed into said pistons; and a shaking plate for supporting a chair at the top thereof for seating a user, said pistons penetrating said shaking plate and being coupled to upper parts of said support plates. The invention increases/decreases shaking of the chair to increase the reality, smoothly and rapidly carries out dynamic displacement and acceleration/deceleration of the chair, simplifies the structure of the actuators, and saves the manufacturing cost of the actuators to provide the simulator in a low price. The simulator smoothly accelerates and/or decelerates shaking of the chair to increase reality, and simplifies the actuator structure to save the manufacturing cost.

8 Claims, 8 Drawing Sheets

US 6,793,495 B2

VIRTUAL REALITY SIMULATOR

BACKGROUND OF THE INVENTION

1. Field of the Invention

The present invention relates to a simulator for experiencing virtual reality, and more particularly, to a virtual reality simulator which rotates and vertically shakes a chair which is coupled on the same as well as adopts crank-type actuators to increase/decrease shaking of the chair, thereby increasing the reality, smoothly and rapidly carrying out dynamic displacement and acceleration/deceleration of the chair, simplifying the structure of the actuators, and saving the manufacturing cost.

2. Description of the Related Art

As well known to those skilled in the art, a virtual reality simulator reproduces dynamic displacement according to virtual reality under the control of a computer so that a user may feel motion in the virtual reality as the real. Examples of the virtual reality simulator generally include chairs in game rooms and the like.

In such a virtual reality simulator, it is necessary to more vigorously vibrate a chair of the user to actively reproduce dynamic displacement so that the user of the virtual reality simulator can more actually feel the virtual reality.

For the purpose of realizing the above dynamic displacement, the simulator has adopted an actuator with a hydraulic cylinder or a pneumatic cylinder in the related art. However, in order to obtain the above simulator in which acceleration and deceleration are hardly controlled, an additional hydraulic cylinder or the pneumatic cylinder should be designed and manufactured. Then, the manufacturing cost of the actuator is increased as a drawback.

In order to solve the above problem, a proposal is made for a rack-and-pinion type actuator which is easily controlled in acceleration/deceleration. However, this type actuator has problems that shaking speed is too slow to realize rapid dynamic displacement and the manufacturing cost thereof is expensive.

SUMMARY OF THE INVENTION

Accordingly the present invention has been made to solve the foregoing problems and it is an object of the present invention to provide a simulator for experiencing virtual reality which has crank-type actuators so as to realize a simple structure, obtain rapid dynamic displacement and acceleration/deceleration, and reduce the manufacturing cost of the actuators thereby providing the simulator at a low price.

According to an aspect of the invention to obtain the above object, it is provided a simulator for experiencing virtual reality comprising: a support frame; a disk plate provided over said support frame as distanced therefrom via a base plate; a lower plate rotatably coupled on said disk plate and having rotary means at one side thereof; an upper plate provided over said lower plate as distanced therefrom in a cooperative manner; a plurality of actuators hinged to the outer circumference of said upper plate and pivotal into the center and the outer circumference of said upper plate, each of said actuators being provided at an upper part with a piston and at a lower part with driving means for elevating said piston; a plurality of support plates pivotally provided on said pistons of the actuators via ball joints fixedly screwed into said pistons; and a shaking plate for supporting a chair at the top thereof for seating a user, said pistons penetrating said shaking plate and being coupled to upper parts of said support plates. The invention increases/decreases shaking of the chair to increase the reality, smoothly and rapidly carries out dynamic displacement and acceleration/deceleration of the chair, simplifies the structure of the actuators, and saves the manufacturing cost of the actuators to provide the simulator in a low price.

BRIEF DESCRIPTION OF THE DRAWINGS

The above and other objects, features and other advantages of the present invention will be more clearly understood from the following detailed description taken in conjunction with the accompanying drawings.

DETAILED DESCRIPTION OF THE PREFERRED EMBODIMENT

Figure 1:
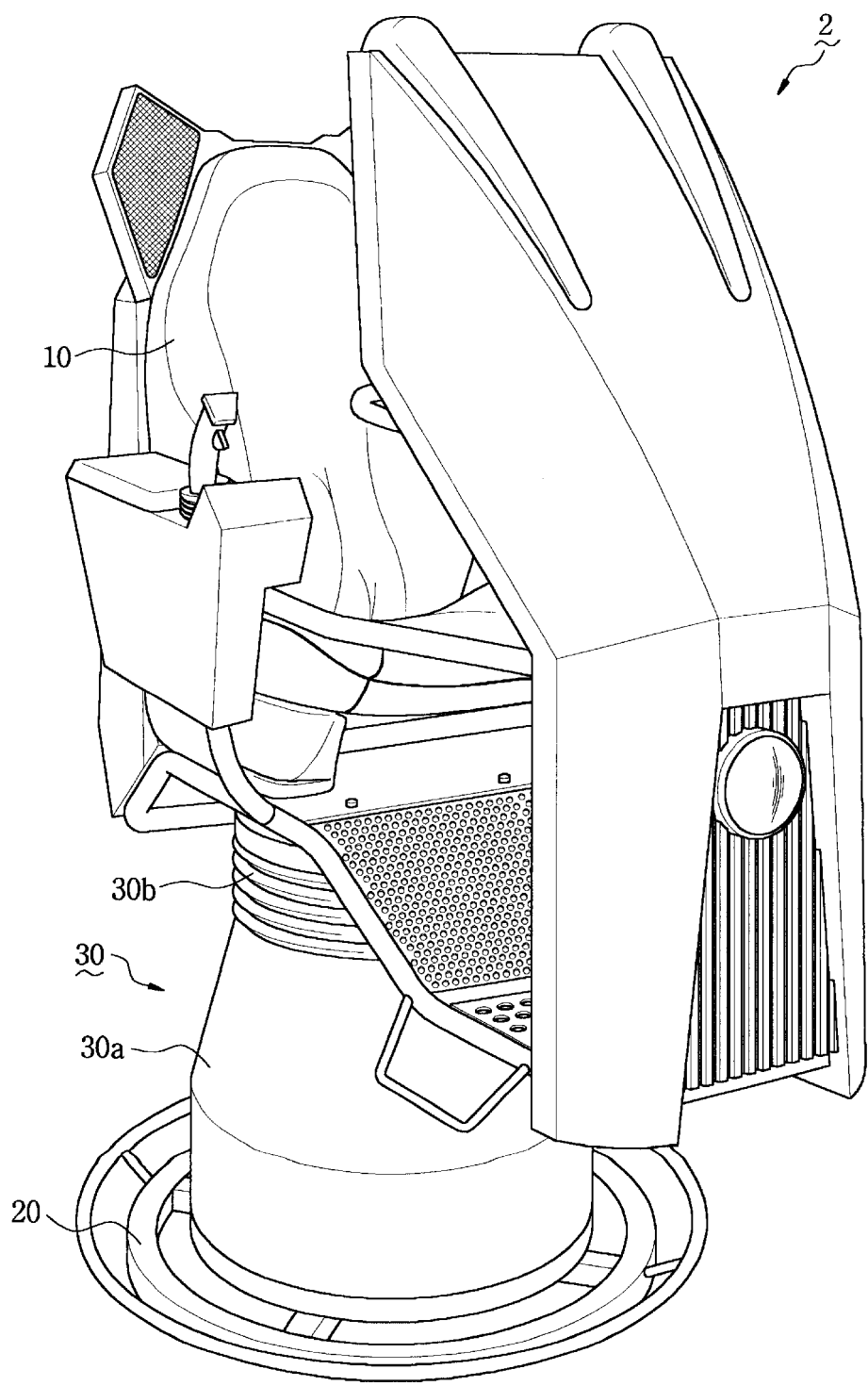
FIG. 1 is an assembled perspective view illustrating a simulator according to the invention.
Figure 2:
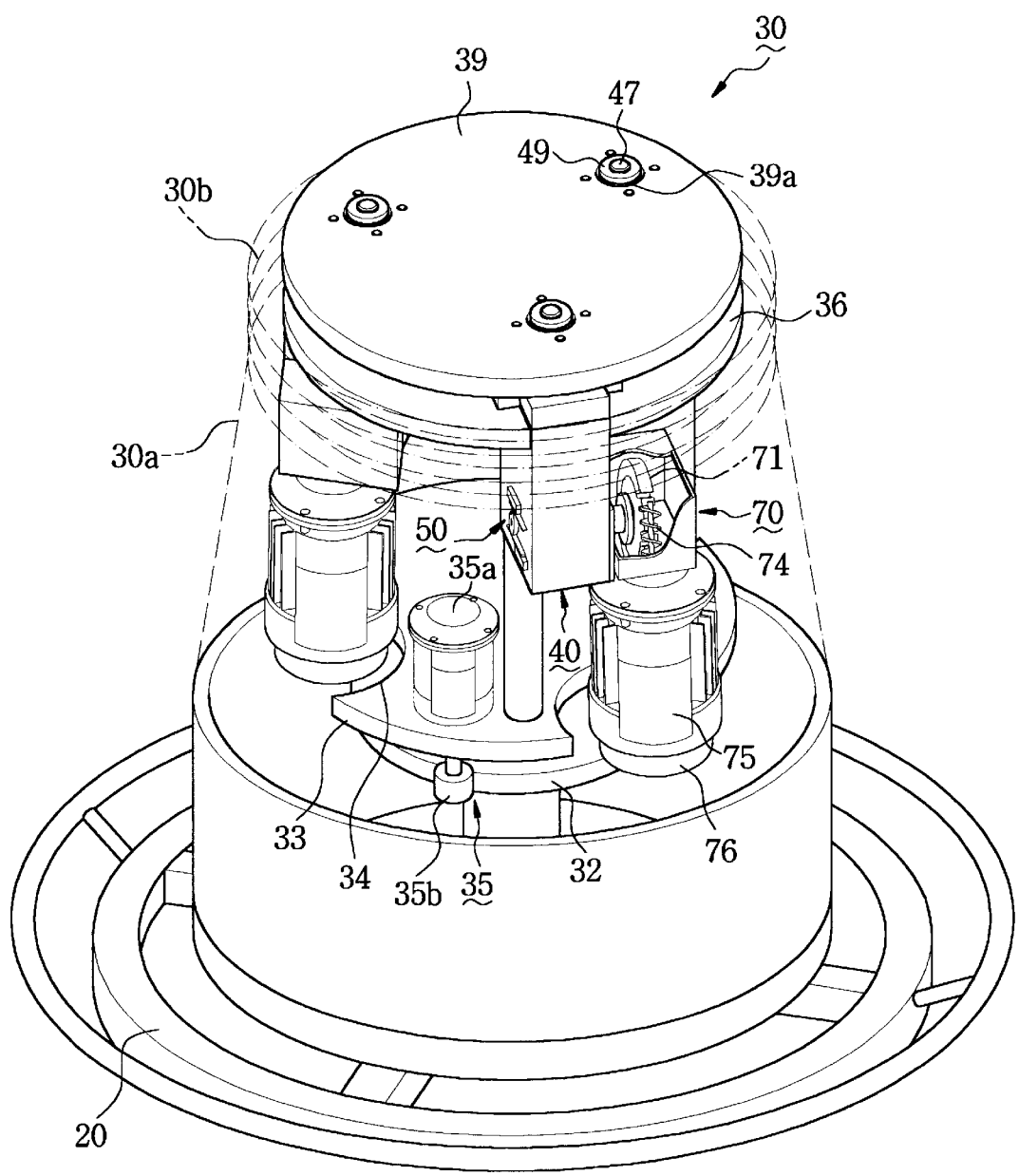
FIG. 2 is a perspective view illustrating a driving unit of a simulator according to the invention.

FIGS. 1 to 8 show a virtual reality simulator 2 according to the invention which is generally comprised of a chair 10, a driving unit 30 and a support frame 20.

The support frame 20 for supporting the simulator 2 is provided in a place desired to install the simulator 2.

Further, the driving unit 30 is provided over the support frame 20, and the chair 10 is provided over the driving unit 30. The chair 10 is adjustable in both of forward and backward directions according to the body of a user as typical sheet adjustment means in a vehicle, and has a computer in the front portion and a control lever at the side.

In the meantime, the driving unit 30 is provided on the support frame 20 to rotate and elevate the chair 10 for playing the same.

Further, the driving unit 30 is mainly comprised of a base plate 31, a disk plate 32, a lower plate 33, rotary means 35, an upper plate 36, three actuators 40, three driving means 70, a shaking plate 39 and the like.

The base plate 31 is fixedly installed on the support frame 20, and the disk plate 32 is provided on the base plate 31 as distanced therefrom at a certain distance.

Further, on the disk plate 32 is provided the lower plate 33 which is rotatably installed with a certain distance therefrom. A bearing (not shown) is preferably provided in a connecting section between the lower plate 33 and the disk plate 32.

The above lower plate 33 is provided at the outer circumference with a plurality of recesses 34 which are so incised to avoid interruption from shaking of the actuator 40, and the rotary means 35 is provided on the lower plate 33 at one side between the adjacent recesses 34.

The rotary means 35 comprises a rotary motor 35a, which is rotatable forwardly and reversely, on the lower plate 33 and a roller 35b under the rotary motor 35a. The roller 35b is driven by the rotary motor 35a, and contacts to the outer circumference of the disk plate 32 so as to roll along the same.

In the meantime, the upper plate 36 is provided over the lower plate 33 as distanced therefrom via a plurality of rod members, and cooperates with the lower plate 33.

The three actuators 40 are hinged to the outer circumference of the upper plate 36 as distanced from each other at 120 degree. The actuators 40 are controlled so that one or all of the actuators 40 are selectively operated.

Each of the actuators 40 has a housing 41 which is rotatably hinged at one side thereof to a hinge bracket 37 fixed to the upper plate 36 via a hinge pin 38. The actuators 40 hinged like this are rotatable toward the center and the outer circumferential direction of the upper plate 36.

In the meantime, the each actuator 40 is substantially quadrangular shaped and has the housing 41 for constituting the contour of the each actuator 40 so as to prevent exposure of the inside.

Figure 3:
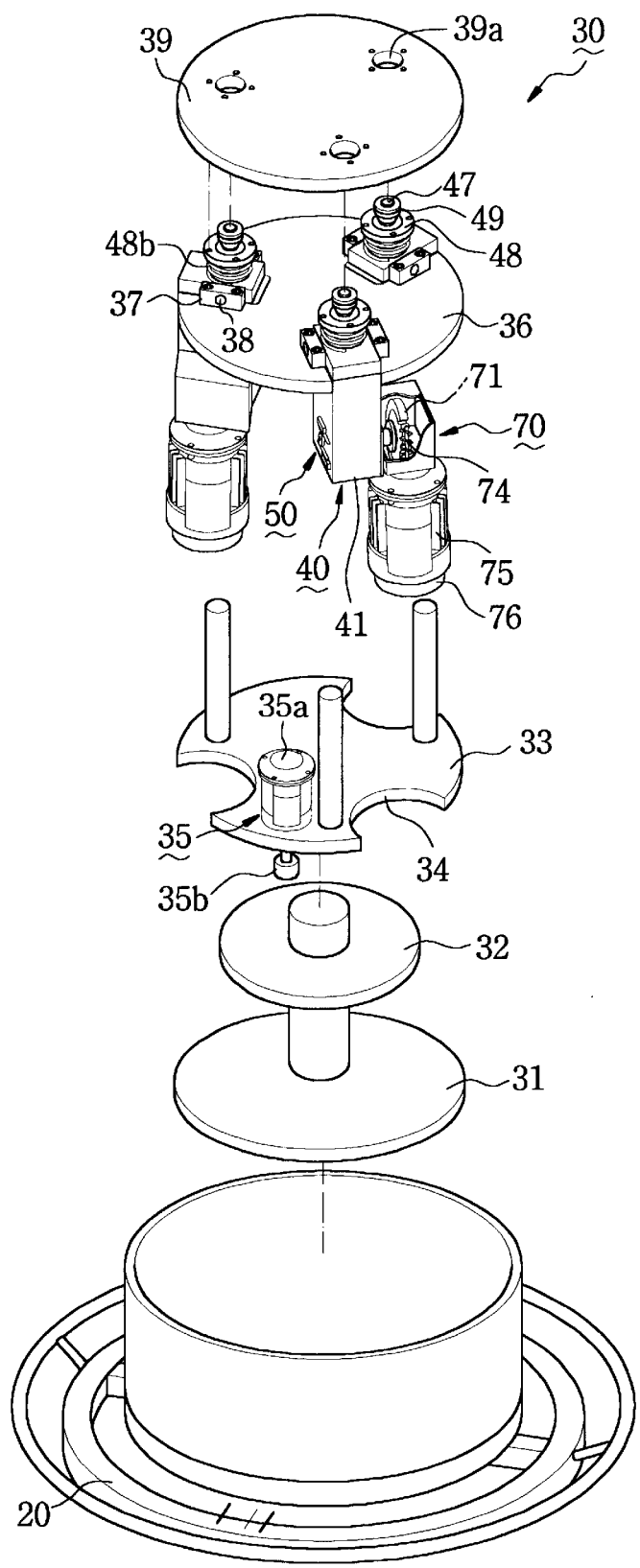
FIG. 3 is an exploded perspective view illustrating a driving unit of a simulator according to the invention.
Figure 4:
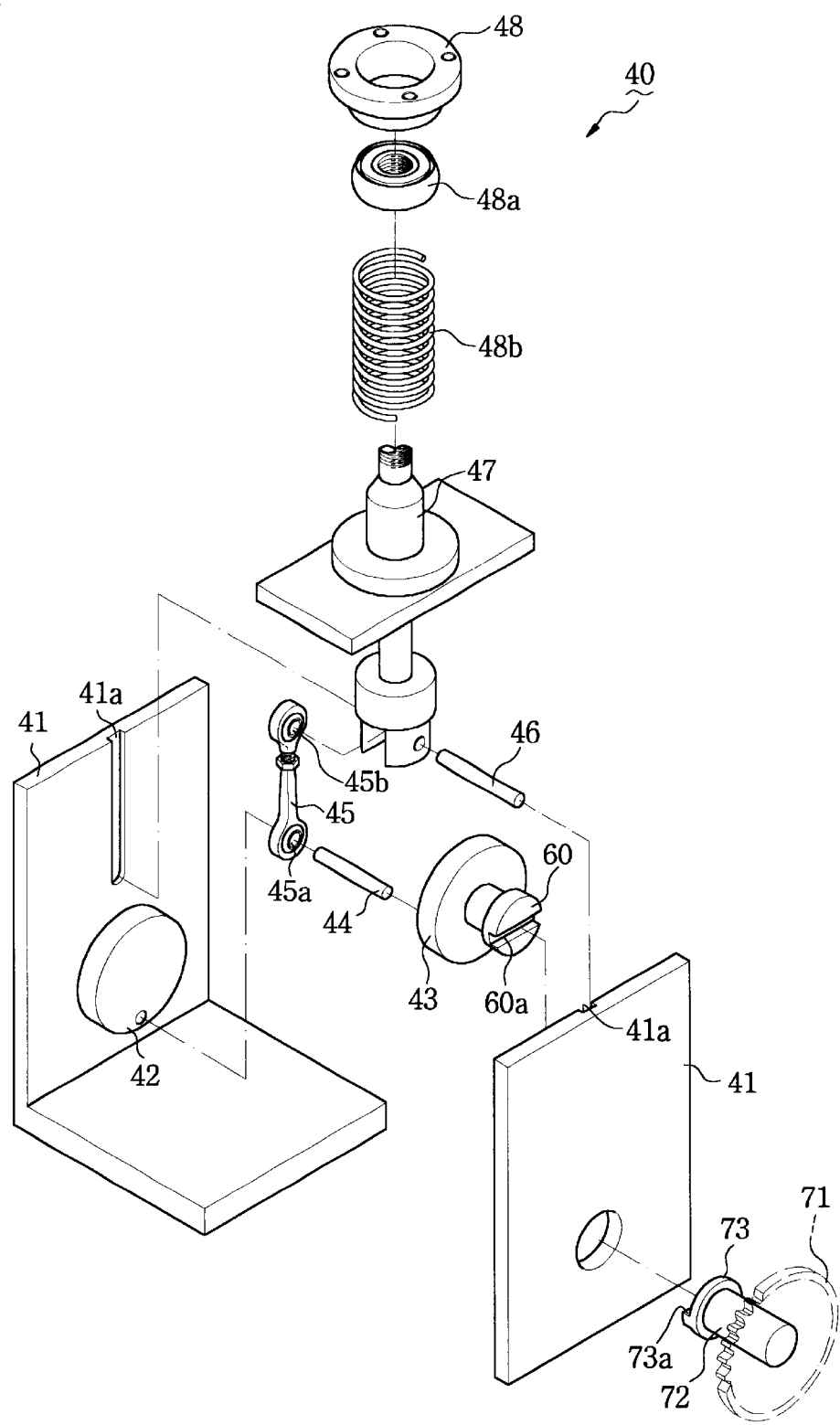
FIG. 4 is an exploded perspective view illustrating an actuator of a simulator according to the invention.
Figure 5:
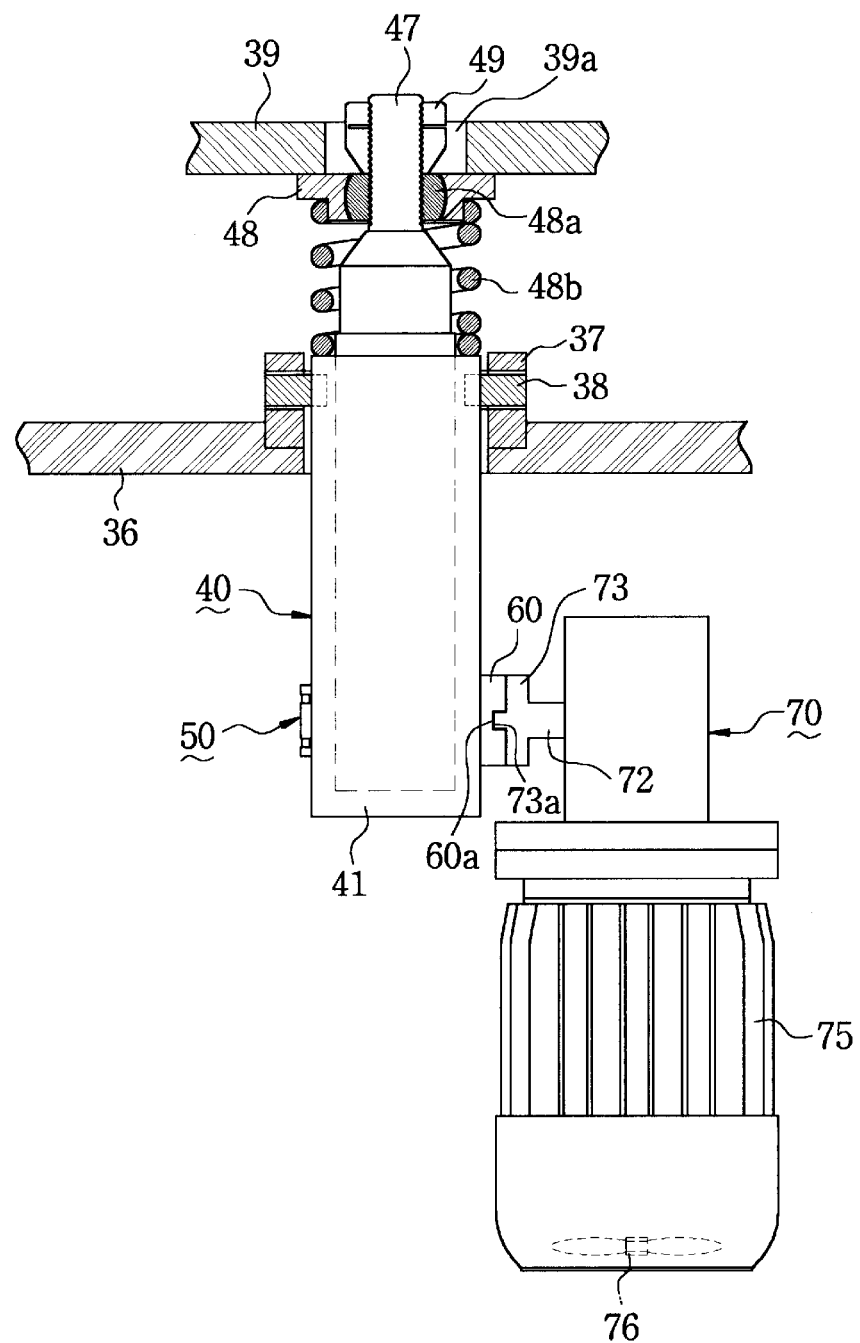
FIG. 5 is an assembled sectional view illustrating an actuator according to the invention.
Figure 6:
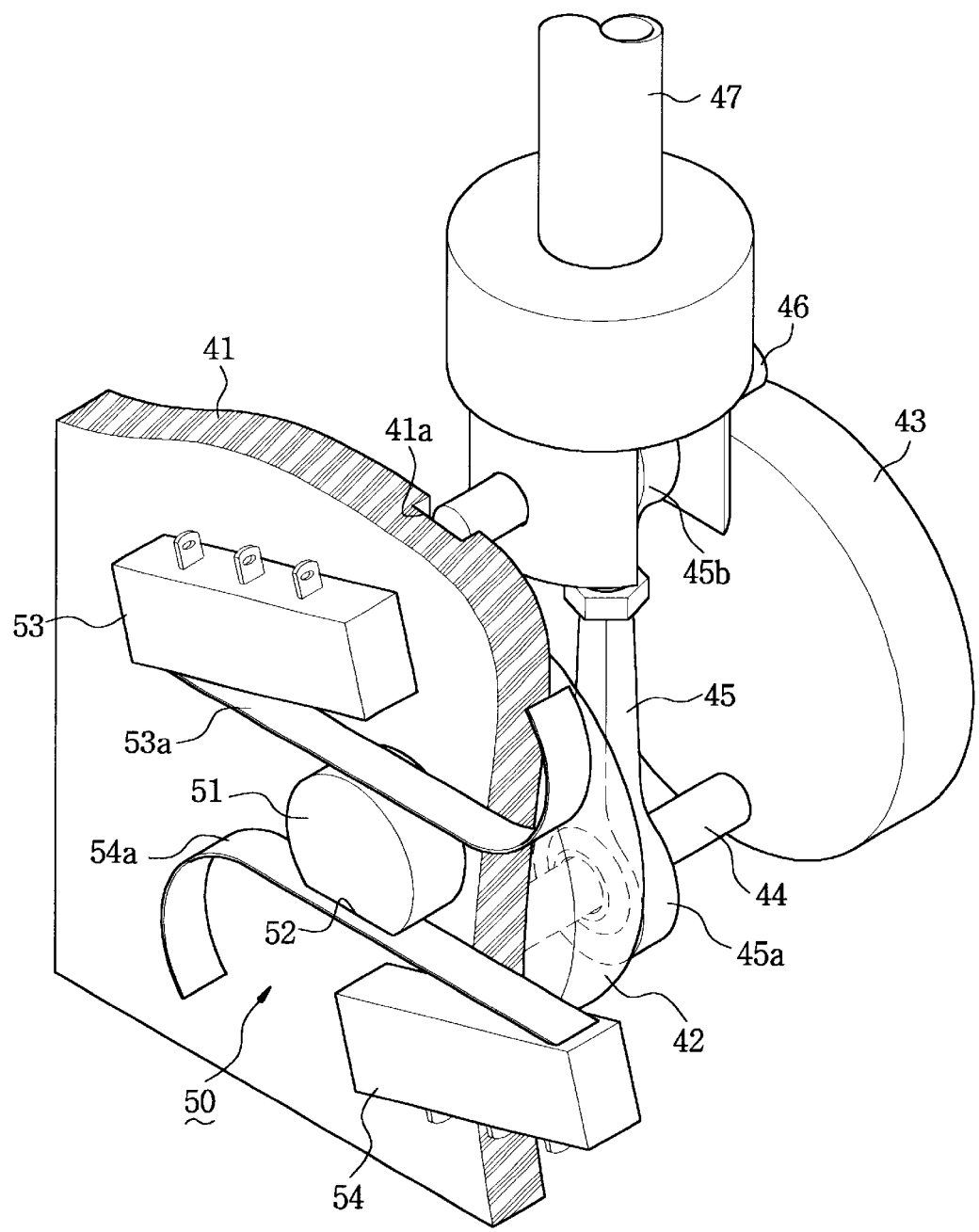
FIG. 6 is a perspective view illustrating detection means of an actuator according to the invention.

A piston 47 is provided on the each housing 41 to penetrate the same, and a support plate 48 is provided in the outer circumference of the outwardly penetrated piston 47 via screwed ball joint 48a. (Although three pistons 47 are shown in FIG. 3, description will be made in respect to one of them.) Over the support plate 48, a lock nut 49 is screwed into a top portion of the piston 47 so as to prevent release of the support plate 48.

Between the support plate 48 and the housing 41 is provided an elastic member 48b, which is inserted into the piston 47 and made of a compressive spring for alleviating impact due to rotation of the support plate 48.

The elastic member 48b is preferably fixed at both ends thereof to the lower face of the support plate 48 and to the upper face of the housing 41.

Further, a connecting rod 45 having a smaller end 45b and a larger end 45a is rotatably hinged to the lower end of the piston 47, in which the upper smaller end 45b is inserted into the lower end of the piston 47 and rotatably hinged via a hinge pin 46.

The hinge pin 46 has both ends inserted into guide grooves 41a longitudinally formed in both inner walls of the housing 41, and is guided along the guide grooves 41a when the piston 47 and the connecting rod 45 are elevated so as to prevent eccentricity of the piston 47 and the connecting rod 45.

Further, the lower larger end 45a of the connecting rod 45 is connected to a plurality of first and second crank cams 42 and 43 which are rotatably hinged to the housings 41.

The crank cams 42 and 43 are eccentrically hinge to the larger end 45a of the connecting rod 45 via the hinge pin 44. The second crank cam 43 is detachably coupled to each of the driving means 70 for elevating the piston 47 and the connecting rod 45 at an outer face of the housing 41. On the other hand, the first crank cam 42 is connected to detection means 50 at another outer face of the housing 41.

In the meantime, the each driving means 70 is comprised of a worm wheel 71, a worm gear 74, a driving motor 75 and a cooling fan 76.

The worm wheel 71 is coupled to the second crank cam 43 at one side. A coupler 60 is formed integral with the second crank cam 43 at a central portion of one side of the second crank cam 43. The coupler 60 outwardly penetrates from the housing 41 and has a groove 60a at one face. The worm wheel 71 corresponding to the coupler 60 has a coupler 73 cooperating with the worm wheel 71 via a connecting shaft 72 and having a projection 73 which is so shaped to be inserted into the groove 60a and coupled thereto.

Therefore, the each driving means 70 which is detached under repair or maintenance can be simply connected to each of the actuators 40 thereby improving the maintainability, assembling ability and workability thereof.

In the meantime, the worm wheel 71 has a gear section meshed into a worm gear 74, which is connected to the driving motor 75 rotatable in forward and reverse directions for driving the worm gear 74. Under the driving motor 75, is provided the cooling fan 76 for outwardly radiating heat to prevent overheating of the driving motor 75.

The worm wheel 71 and the worm gear 74 of the each driving means 70 configured as above are preferably mounted inside a gearbox.

Further, the detection means 50 functions for detecting the current condition of the shaking chair in order to simplify the initial installation of the actuator 40 and rapidly return the actuator 40 into the original position after actuation thereof.

The above detection means 50 detects the top and bottom dead points of the piston 47 and random position values in actuation via an encoder (not shown).

The detection means 50 is provided with a detection plate 51 which penetrates the housing 41 for cooperating with the first crank cam 42 at a central portion of one face of thereof. The detection plate 51 is provided with a stepped section 52 which is stepped from the outer circumference of the detection plate 51.

Detection sensors 53 and 54 are provided in upper and lower portions of the housing 41 and distanced from the detection plate 51 to detect the stepped section 52 of the detection plate 51 rotating with the first crank cam 42.

Although any of the detection sensors 53 and 54 may be used, the detection sensors 53 and 54 have leaf springs 53a and 54a, respectively, according to this embodiment. Switching of the detection sensors 53 and 54 is on when the round outer circumference of the detection plate 51 contact with the leaf springs 53a and 54b, and off when the stepped section 52 contacts with any of the leaf springs 53a and 54b.

In the meantime, the shaking plate 39 for fixedly settling the chair 10 is arranged in the upper portion of the driving unit 30 having the above configuration The shaking plate 39 has through-holes 39a which are perforated into the shaking plate 39 for receiving the pistons 47 of the actuators 40, respectively. The pistons 47 of the actuators 40 are inserted into the shaking plate 39 via the through-holes 39a for fixing the shaking plate 39 to the support plates 48.

Over the shaking plate 39 fixed as above is fixed the chair 10 via brackets.

In the meantime, the driving unit 30 configured as above is protected by a cover 30a defining the contour thereof and a bellows 30b contractible according to displacement of the chair 10 which shakes between the driving unit 30 and the shaking plate 39.

Figure 7:
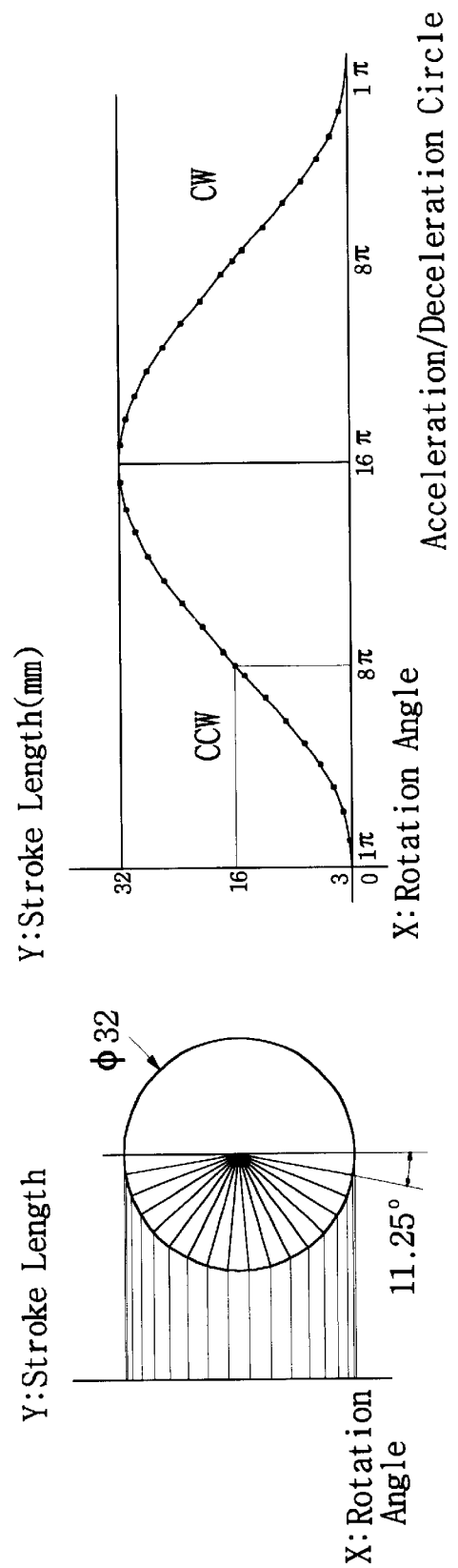
FIG. 7 is a diagram illustrating the principle of a crank-type actuator according to the invention.

Further, the actuator 40 of the invention converts a rotary motion into a linear motion as shown in FIG. 7, which illustrates the magnitude of stroke according to rotation of the crank cams 42 and 43.

When the diameters of the crank cams 42 and 43 are equally divided into 16 parts, the angles are equivalently divided into 11.25 degree. However, there is a difference between constant acceleration/deceleration rates according to the position of each stroke distance according to rotation angle.

When the crank cams 42 and 43 carry out repetitive motion through forward and reverse rotation of 180 degree, the piston 47 and the connecting rod 45 move while drawing acceleration/deceleration circles as shown in the FIG. 7.

The actuator 40 carries out acceleration/deceleration circular motion which is not performed by a conventional hydraulic or pneumatic cylinder or a rack-and-pinion type actuator. There are advantages that the actuator 40 is applicable at a lower price compared to a conventional actuator in a motion-based game machine in which precise numerical control is not required and thus a control program thereof is made simpler.

Further, the operation of the above simulator 2 is preferably controlled by a computer provided in the chair 10 or an additional controller via a regulator.

Further, the driving motors 75 and the rotary motor 35a are preferably made of servomotors.

Description will be made about the operation of the simulator 2 configured as above according to the invention as follows: When the rotary motor 35a provided on the lower plate 33 is driven, the roller 35b provided in the lower part of the rotary motor 35a rotates as contacting with the outer circumference of the disk plate 32 so that the driving unit 30 and the chair 10 of the simulator 2 rotates on the disk plate 32.

The driving unit 30 and the chair 10 are rotated in forward and reverse directions via forward and reverse driving of the rotary motor 35a, and the lower plate 33 of the driving unit 30 is rotated on the disk plate 32, in particular, smoothly by the bearing placed between the lower plate 33 and the disk plate 32.

Further, the actuators 40 placed on the upper plate 36 of the simulator 2, which rotates as above, vertically shake the shaking plate 39 and the chair 10 provided over the upper plate 36 with the each driving means 70 respectively provided at one sides of the actuators 40.

In this case, the shaking plate 39 and the chair 10 vertically shake into various displacements as separately driven by their own actuators 40.

In the meantime, when the driving motors 75 of the each driving means 70 rotatable in the forward and reverse directions are driven, the worm gears 74 at the upper ends of the driving motors 75 are rotationally driven. Then, rotation of the worm gears 74 rotationally drives the worm wheels 71 meshed into the worm gears 74.

Then, the projections 73a of the couplers 73 integral with the connecting shafts 72 rotationally drive the second crank cams 43, respectively, since the projections 73a are coupled to the grooves 60a of the couplers 60 which are integrally formed in the central portions of the second crank cams 43 at one sides of the actuators 40.

The each crank cam 43 rotationally driven as above is driven in cooperation with the crank cam 42 provided in the opposite via the hinge pin 44. Due to rotary driving of the crank cams 42 and 43, the each connecting rod 45 with the lower larger end 45a being rotatably hinged to the hinge pin 44, which connects between the both crank cams 42 and 43, cooperatively converts rotary motion of the crank cams 42 and 43 into vertical reciprocating motion.

Due to the vertical reciprocating motion of the connecting rod 45, the each piston 47 rotatably connected to the lower end 45b of the connecting rod 45 via the each hinge pin 46 carries out vertical reciprocating motion in cooperation with the connecting rod 45.

In this case, the both ends of the each hinge pin 46 hinged to the smaller end 45b of the above connecting rod 45 are guided along the guide grooves 41a formed in the housing 41 of the each actuator 40 to perform stable vertical reciprocating motion thereby preventing eccentricity of the each connecting rod 45 and the each piston 47.

Further, the vertical reciprocating motion of the pistons 47 enables vertical reciprocating motion of the shaking plate 39 fixedly coupled on the support plates 48 which are provided in the upper ends of the pistons 47 via the ball joints 48a.

Figure 8:
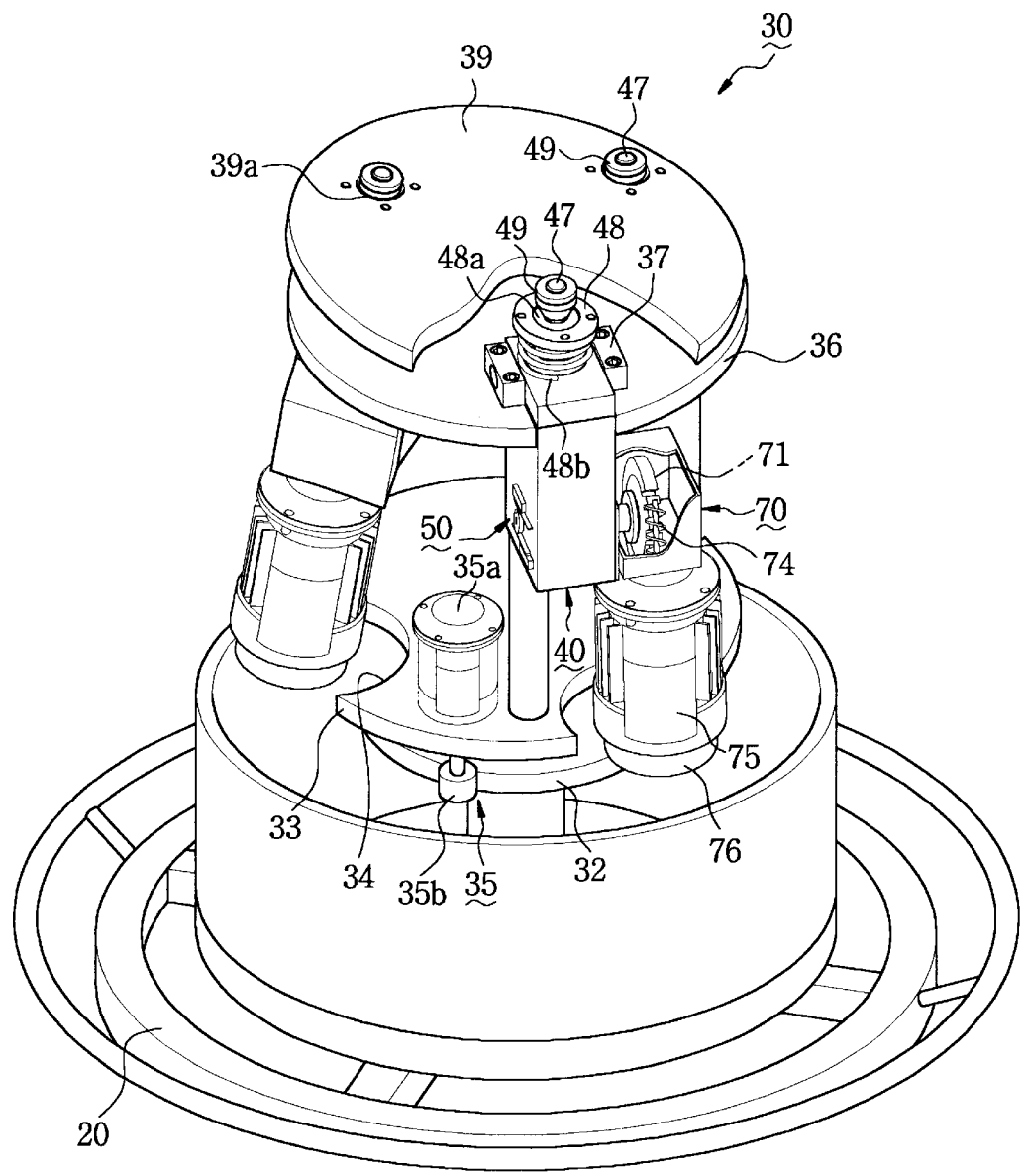
FIG. 8 is a perspective view illustrating a simulator in use according to the invention.

In the shaking plate 39 shaking as above, as shown in FIG. 8, driving one of the actuators 40 elevates the piston 47 provided in the driven actuator 40. This raises the support plate 48 coupled to the upper end of the piston 47 via the ball joint 48a screwed thereto while tilts the support plate 48 on the ball joint 48a so as to incline the shaking plate 39.

Therefore, the actuators 40 driven as above accelerates and/or decelerates the shaking plate 39 so that the shaking plate 39 draws various circles while shaking.

Further, when the shaking plate 48 is driven as tilted as above, the elastic members 48b made of the compressive springs between the support plates 48 and the housings 41 alleviate impact due to load applied from the chair 10.

In the meantime, the actuators 40 are angled at 120 degree from one another on the upper plate 36 and rotatably hinged on the hinge brackets 37 of the upper plate 36 via the hinge pins 38. When at least one of the actuators 40 is simultaneously driven, the actuator 40 is rotated toward the central portion or the outer circumference of the upper plate 36 to further compensate the angle of the shaking plate 39 which is shaking while making various displacements by the support plates. Then, motion of the chair 10 is more dynamically reproduced.

In other words, the each driving means 70 is controlled according to a program inputted into a computer or an additional controller to selectively drive at least one actuator 40 as well as the driving means 70 is driven to variously change the position of the chair 10 in three-dimensional spatial coordinates so that motion in the virtual reality can be dynamically reproduced.

In the meantime, a current driving condition of the each actuator 40 driven as above is detected by the each detection means 50 which is provided in one side thereof, and then inputted into the computer or controller.

This means that the leaf springs 53a and 54a of the detection sensors 53 and 54, which are distanced from each other over and under the detection plate 51 of the detection means 50, contact with the outer circumference of the detection plate 50 when the detection plate 51 rotates together with the crank cam 42. When the leaf springs 53a and 54a of the detection sensors 53 and 54 contact with two points in the outer circumference of the detection plate 51, contacts of the detection sensors 53 and 54 are on. When any of the leaf springs 53a and 54a of the detection sensors 53 and 54 contacts with the stepped section 53 of the detection plate 51, the contacts of the detection sensors 53 and the 54 are off. Although not shown, a random value of the stepped section 52 is detected by an encoder.

Therefore, in the actuators 40 for shaking the shaking plate 39 and the chair 10, the pistons 47 and the connecting rods are positioned in the bottom dead points by means of controlling the driving means 70 with the detection means 50 after the simulator 2 is driven.

According to the virtual reality simulator of the invention as described hereinbefore, the crank-type actuators are adopted to increase/decrease shaking of the chair thereby increasing the reality, smoothly and rapidly carrying out dynamic displacement and acceleration/deceleration of the chair and simplifying the structure of the actuators. The manufacturing cost of the actuators is saved so that the simulator can be provided at a low price.

What is claimed is:

1. A simulator for experiencing virtual reality comprising:
   a support frame;
   a disk plate provided over said support frame as distanced therefrom via a base plate;
   a lower plate rotatably coupled on said disk plate and having rotary means at one side thereof;
   an upper plate provided over said lower plate as distanced therefrom in a cooperative manner;
   a plurality of actuators hinged to the outer circumference of said upper plate and pivotal into the center and the outer circumference of said upper plate, each of said actuators being provided at an upper part with a piston and at a lower part with driving means for elevating said piston;
   a plurality of support plates pivotally provided on said pistons of the actuators via ball joints fixedly screwed into said pistons; and
   a shaking plate for supporting a chair at the top thereof for seating a user, said pistons penetrating said shaking plate and being coupled to upper parts of said support plates.

2. The simulator for experiencing virtual reality according to claim 1, wherein said rotary means comprises:
   a rotary motor being rotatable forwardly and reversely, and provided on said lower plate at one side; and
   a roller rotatably connected to said rotary motor, and rollably contacting with the outer circumference of said disk plate.

3. The simulator for experiencing virtual reality according to claim 1, wherein each of said actuators comprises:
   a housing defining the contour of said each actuator,
   said each piston upwardly penetrating said housing and each of said support plates being coupled to an externally penetrated portion of said each piston via said screwed ball joint at the outer circumference;
   a connecting rod having a lower larger end and an upper smaller end rotatably hinged to a lower part of said each piston via a hinge pin; and
   first and second crank cams and eccentrically hinged to both sides of said larger end of the connecting rod via a hinge pin, said first crank cam being connected to a detection means, and said second crank cam being connected to said driving means for elevating said each piston and said connecting rod.

4. The simulator for experiencing virtual reality according to claim 3, wherein said housing is provided at both inner walls with guide grooves into which both ends of said hinge pin hinged to said smaller end of the connecting rod are inserted for guiding said each piston and said connecting rod.

5. The simulator for experiencing virtual reality according to claim 3, further comprising elastic members, each of said elastic members being inserted into said each piston between said each support plate and said housing for alleviating impact due to rotation of said each support plate.

6. The simulator for experiencing virtual reality according to claim 3, wherein said driving means is detachably provided in an outer face of said housing, and comprises:
   a worm wheel connected to said second crank cam;
   a worm gear driven as meshed into said worm wheel;
   a driving motor rotatable forwardly and reversely for driving said worm gear; and
   a cooling fan provided in a lower part of said driving motor for preventing said driving motor from being overheated.

7. The simulator for experiencing virtual reality according to claim 6, wherein said second crank cam has a first coupler in a cooperative manner, said first coupler outwardly penetrating from said housing and having a coupler groove formed at one side, and said worm wheel opposed to said second crank cam has a second coupler in a cooperative manner, said second coupler having a projection inserted and coupled into said coupler groove, so that said second crank cam and said work wheel are easily coupled and separated.

8. The simulator for experiencing virtual reality according to claim 3, wherein said detection means is connected to said first crank cam for detecting a current condition of said shaking chair, and comprises:
   a detection plate penetrating said housing from one side of said first crank cam in a cooperative manner;
   a stepped section stepped from one side of the outer circumference of said detection plate; and
   detection sensors and detached over and under said detection plate for detecting said stepped section of the detection plate rotating in cooperation with said first crank cam.

* * * * *